United States Patent [19]

Norio

[11] Patent Number: 5,432,846
[45] Date of Patent: Jul. 11, 1995

[54] AUTOMATIC TELEPHONE CALL DISTRIBUTION APPARATUS AND METHOD FOR ELECTRONIC SWITCHING SYSTEM

[75] Inventor: Masuoka Norio, Tokyo, Japan

[73] Assignee: Kabushiki Kaisha Toshiba, Kawasaki, Japan

[21] Appl. No.: 240,071

[22] Filed: May 9, 1994

Related U.S. Application Data

[63] Continuation of Ser. No. 166,798, Dec. 2, 1993, abandoned, which is a continuation of Ser. No. 554,425, Jul. 19, 1990, abandoned.

[30] Foreign Application Priority Data

Jul. 19, 1989 [JP] Japan ................... 1-186360

[51] Int. Cl.[6] ............................................. H04Q 3/64
[52] U.S. Cl. ................................. 379/266; 379/265; 379/142; 379/211
[58] Field of Search ............... 379/265, 266, 142, 210, 379/211, 212, 213, 214, 242

[56] References Cited

U.S. PATENT DOCUMENTS

| | | | |
|---|---|---|---|
| 4,277,649 | 7/1981 | Sheinbein | 379/246 |
| 4,731,824 | 3/1988 | Kohlmeier | 379/265 |
| 4,964,155 | 10/1990 | Pinard | 379/266 |
| 5,020,095 | 5/1991 | Morganstein et al. | 379/266 |
| 5,025,468 | 1/1991 | Sikard et al. | 379/266 |
| 5,029,196 | 7/1991 | Morganstein | 379/214 |

OTHER PUBLICATIONS

Teleconnect, "The Complete Guide To ACDs, 1988" by Sal Moccardi, Apr. 1988, pp. 128–155.

*Primary Examiner*—Ahmad Matar
*Attorney, Agent, or Firm*—Banner & Allegretti, Ltd.

[57] ABSTRACT

The present invention discloses a switching system including a switch exchange coupled to a plurality of telephone lines and a plurality of telephone sets. When the exchange receives an incoming telephone call from the telephone line, it determines idle telephone sets which are able to respond to the incoming telephone call. If all the telephone sets are busy, the exchange holds the incoming telephone call. Then, the exchange detects the number of the held incoming telephone calls and compares the detected number with a predetermined number. If the detected number is more than the predetermined number, the exchange transmits alarm information to a predetermined telephone set to provide notification of the status of the held incoming telephone calls.

10 Claims, 8 Drawing Sheets

FIG. 2

| D N | STATUS (1/0) |
|---|---|
| 100 | 1 |
| 101 | 0 |
| ⋮ | ⋮ |
| m | 1 |

(1 : BUSY / 0 : IDLE) } MB1

FIG. 3

| TRK DN | STATUS (1/0) |
|---|---|
| 1 | 0 |
| 2 | 1 |
| ⋮ | ⋮ |
| n | 0 |

(1 : BUSY / 0 : IDLE) } MB2

FIG. 4

| TRK DN | GROUP NUMBER |
|---|---|
| TDN1 | I |
| TDN2 | I |
| ⋮ | ⋮ |
| TDNn | V |

| GROUP NUMBER | D N | | | |
|---|---|---|---|---|
| I | DN 100 | DN 200 | ---- | DN 210 |
| II | DN 110 | DN 300 | ---- | DN 330 |
| ⋮ | | ⋮ | | |
| V | DN 500 | DN 510 | ---- | DN 550 |

} MB4

← PRIORITY

FIG. 6

| D N | E K T | | | |
|---|---|---|---|---|
| 100 | 10a | 10b | ---- | 10g |
| 101 | 10b | 10d | ---- | 10e |
| ⋮ | | ⋮ | | |
| 550 | 10k | 10ℓ | ---- | 10m |

| GROUP NUMBER | T R K  D N | | | |
|---|---|---|---|---|
| I | TDN1 | | ---- | |
| II | TDN5 | TDN6 | ---- | TDNk |
| ⋮ | | ⋮ | | |
| V | | | ---- | |

| GROUP NUMBER | CURRENT QUEUE NUMBER |
|---|---|
| I | 1 |
| II | 3 |
| ⋮ | ⋮ |
| V | 0 |

| GROUP NUMBER | ALARM MODE (1/0) |
|---|---|
| I | 1 |
| II | 1 |
| ⋮ | ⋮ |
| V | 0 |

$\begin{pmatrix} 1:ON \\ 0:OFF \end{pmatrix}$

| GROUP NUMBER | SUPERVISOR EKT |
|---|---|
| I | 10m |
| II | 10m |
| ⋮ | ⋮ |
| V | 10l |

| GROUP NUMBER | ESTABLISHED QUEUE NUMBER |
|---|---|
| I | 10 |
| II | 5 |
| ⋮ | ⋮ |
| V | 0 |

| E K T | STATUS (1/0) |
|---|---|
| 10a | 1 |
| 10b | 0 |
| ⋮ | ⋮ |
| 10m | 1 |

(1 : BUSY / 0 : IDLE)

} MB11

AUTOMATIC TELEPHONE CALL DISTRIBUTION APPARATUS AND METHOD FOR ELECTRONIC SWITCHING SYSTEM

This application is a continuation, of application Ser. No. 08/166,798 filed Dec. 2, 1993 (now abandoned) which is a continuation of application Ser. No. 07/554,425, filed Jul. 19, 1990 (now abandoned).

BACKGROUND OF THE INVENTION

This invention relates to the field of switching systems, and more particularly relates to an automatic telephone call distribution (ACD) method and apparatus corresponding to incoming telephone calls.

DESCRIPTION OF THE RELEVANT ART

There have been rapid developments in telephone switching systems in recent years. In general, the exchange of a switching system is coupled to a plurality of extensions comprised of telephone sets and office telephone lines. The exchange operates a call sequence by selectively connecting a calling telephone set to a designated called telephone set. The called telephone set responds to the call in order to complete the connection of a speech path between the telephone sets. The exchange also operates another call sequence by selectively connecting an incoming office telephone line to the telephone set that responds to the incoming call. The telephone set responds to the call in order to complete the connection of a speech path between the incoming office line and itself.

Generally, a plurality of telephone sets of the switching system are divided into a plurality of groups. Usually, each group corresponds to a company or a section, etc. and the telephone sets in each group have respective internal telephone numbers. In each group, a call priority is predetermined with respect to an incoming call from an office telephone line. The call sequence is as follows. When the incoming call from the telephone line is detected, the exchange determines a corresponding group at first. Next, the exchange determines a called directory number (DN) on the basis of the predetermined call priority. After the determination, the exchange detects whether the called DN is idle or busy. If the called DN is idle, the exchange carries out transmitting a ringing signal to the telephone sets having the called DN to generate a ringing sound from the telephone sets. If the called DN is busy, the exchange determines another DN corresponding to a next call priority on the basis of the predetermined call priority. Thus, the incoming call is distributed. However, if all DNs in the same group are busy, a further incoming call is held until the busy DN changes to an idle state. In the hold state, the switching system transmits a hold message or music to the calling party. The above call sequence by the call priority is called an automatic call distribution (ACD) feature. The predetermined call priority in each group is a fixed cyclic order for all DNs or a changeable order determined by the number of previous responses relating to each DN, etc. In the changeable order, if a DNx has not yet responded to an incoming call, the DNx is given a first call priority. So, the lower the number of previous responses with respect to a particular DN, the higher the priority of that DN will be. Therefore, the incoming calls are distributed to each DN in the group, equally. This call priority data is input into the switching system by at least one computer connected to the switching system. Usually, a particular telephone set called a supervisor is located near the computer for this purpose.

In conventional telephone switching systems, when a further incoming call is received, the incoming call is held only if all DNs in the group are busy. Therefore, all operators in the switching system can not know the status of the held calls because they are not notified of such. So, the operators can not know for how long the held calling party is kept on hold. Thus the present capabilities of the switching system are inadequate with respect to the calling party.

SUMMARY OF THE INVENTION

It is therefore an object of the present invention to provide an automatic telephone call distribution (ACD) method and apparatus, for a switching system, capable of providing notification of held incoming telephone calls.

It is another object of the present invention to provide an automatic telephone call distribution (ACD) apparatus, for a switching system, capable of urging an operator to change ACD data, such as DN data with respect to an idle telephone set, such that the idle telephone set is able to respond to the held incoming call by the idle telephone set when many incoming telephone calls are being put on hold.

According to the present invention, and in order to realize the above objects, a switching system is provided which includes an exchange with an exchange switch coupled to a plurality of telephone lines and a plurality of telephone sets coupled to the exchange. The telephone sets have a plurality of directory numbers (DNs) corresponding to respective internal telephone numbers. When the exchange receives incoming telephone calls from the telephone lines, it determines the directory numbers (DNs) according to a predetermined relationship between the directory numbers (DNs) and the incoming telephone calls. The exchange then determines the telephone sets designated to the determined directory numbers (DNs) and detects whether the telephone sets are idle or busy. If all telephone sets are busy, the exchange holds the incoming telephone calls. Further, the exchange detects the number of the held incoming telephone calls and compares the detected number with a predetermined number. If the detected number is more than the predetermined number, the exchange transmits alarm information to a predetermined telephone set, such as a telephone set located near a computer for entering data relating to the automatic telephone call distribution. The predetermined telephone set generates alarm information, such as an alarm tone and an alarm message. Thus, the operator of the predetermined telephone set can understand the holding state of the held incoming telephone calls.

BRIEF DESCRIPTION OF THE DRAWINGS

The subject matter which is regarded as the invention is particularly pointed out an distinctly claimed in the claims of the Specification. The invention, however, both as to organization and method of practice, together with further objects and advantages thereof, may be best understood by reference to the following detailed description of the invention taken in conjunction with the drawings in which:

FIGS. 2 through 12 show memory blocks of a memory device shown in FIG. 1 and the contents of the memory blocks;

DETAILED DESCRIPTION OF THE PREFERRED EMBODIMENT

Figure 1:
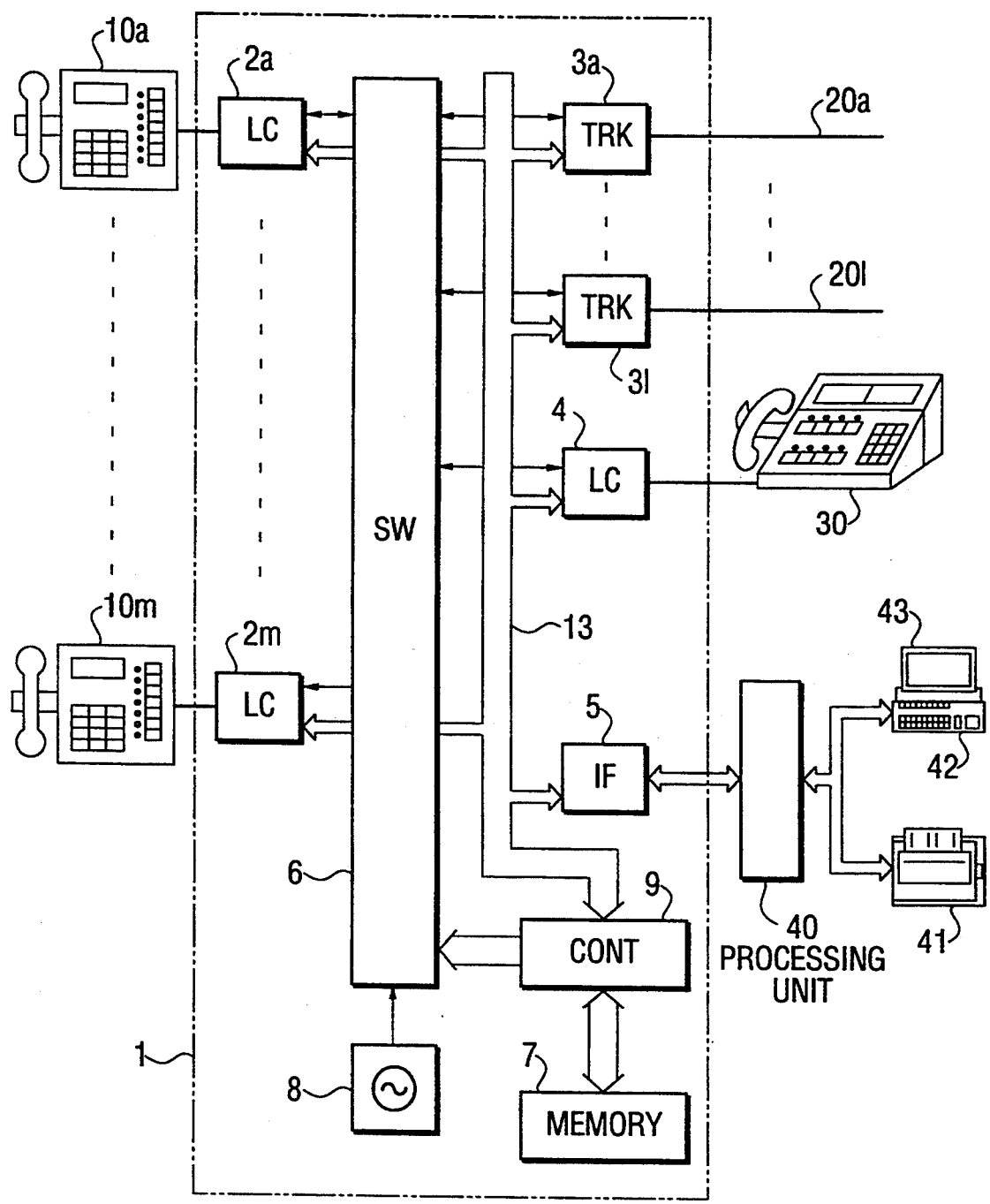
FIG. 1 is a general block diagram illustrating one embodiment of the present invention.
Figure 13:
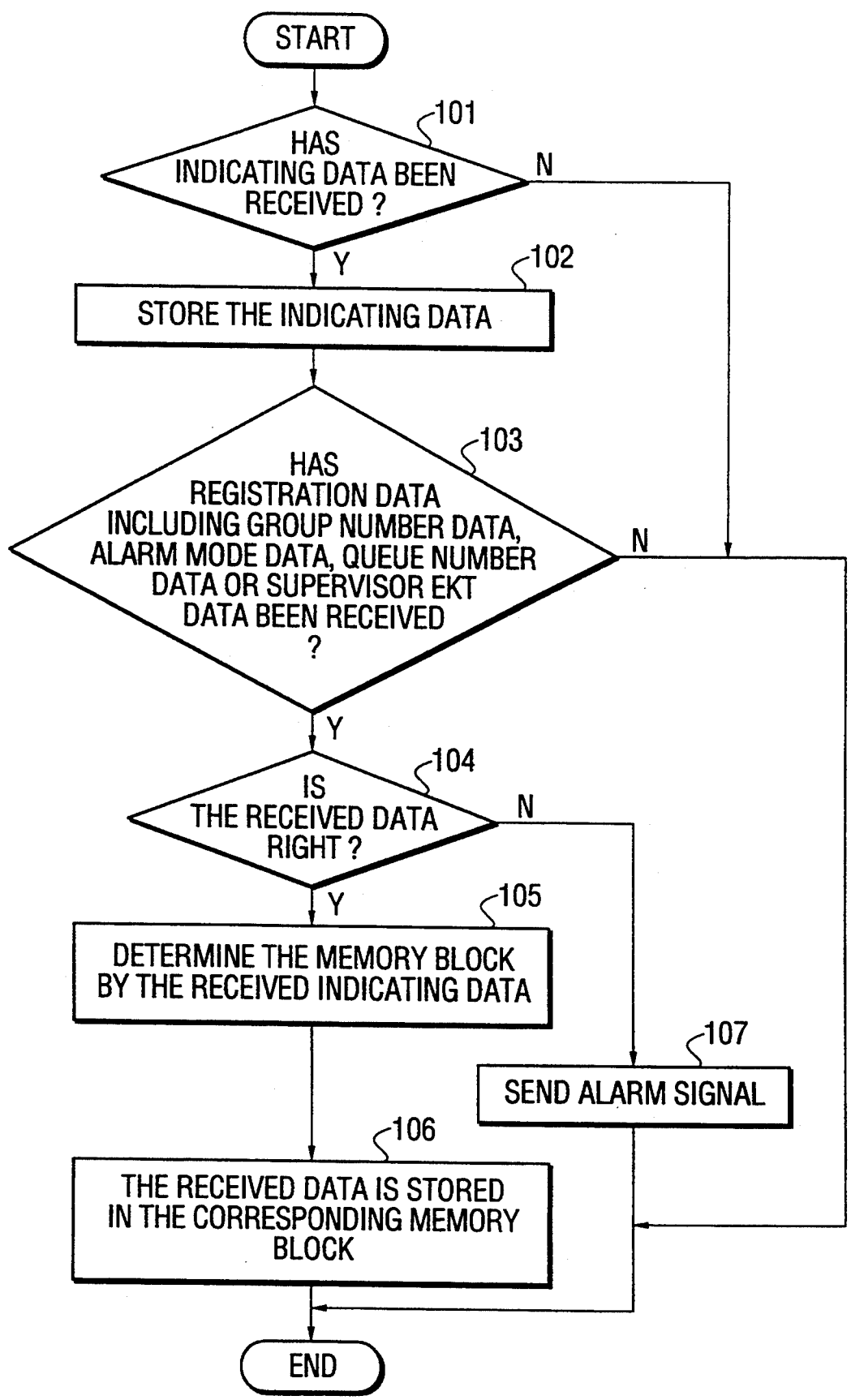
FIG. 13 is a flow chart showing data entry processing by using the processing unit shown in FIG. 1.

FIG. 1 is an illustration of one embodiment of the present invention showing exchange 1. Connected to exchange 1 are electronic key telephone sets (EKTs) 10a-10m, office lines 20a-20l, attendant console 30 and processing unit 40. Exchange 1 includes line circuits 2a-2m connected to respective EKTs 10a-10m, trunk circuit 3a-3l connected to respective office lines 20a-20l, line circuit 4 connected to attendant console 30, interface 5 connected to processing unit 40, exchange switch 6, memory device 7, tone signal source unit 8, control unit 9 and data bus 13.

Each of line circuits 2a-2m includes a converter (not shown) which converts digital signals passing through exchange switch 6 to analog signals to be sent to the respective EKTs and analog signals to digital when passed in the other direction, a controller (not shown) which basically controls transmission of control data from the respective EKTs to control unit 9 through data bus 13 and vice versa, and an interface between the respective EKTs and the converter which Operates to transmit and receive analog signals, bi-directionally and in real time. The interface also operates to transmit and receive control data regarding telephone calls between the respective EKTs and the controller. Line circuit 4 includes substantially the same components as line circuit 2a-2m.

Each of trunk circuits 3a-3l includes a converter (not shown) which operates the same as the converters in line circuits 2a-2m, a controller and an interface. The interface operates to transmit and receive analog signals bi-directionally and in real time. Thus, in this respect, it has the same function as the interface in line circuits 2a-2m. However, the interface for the respective office lines is required to operate as a detector to detect a ringing signal from the respective office lines, to detect the state of call release (completion of call) of the respective office lines and to send control data representing start (and completion) of a telephone call to the exchange of the respective office lines, i.e., to make (or break) the direct current loop of the respective office lines. These functions are all well known in the art as are the functions for the office lines.

The controller controls the transmission of control data conducted by the interface under the control of control unit 9 and transfers the result of the detecting operation of the interface to control unit 9.

Interface 5 is a RS232C interface to transmit data to processing unit 40 and receive data from processing unit 40. The processing unit 40 is connected to printer 41, manual keyboard 42 and CRT display 43.

Exchange switch 6 operates to selectively switch its own speech paths in order to selectively connect the EKTs, the office lines, attendant console 30 and tone signal source unit 8 through the line circuits, the trunk circuits and its own speech path in any combination designated by control unit 9 in time division or multiplexed fashion. This function is also well known in the art.

Audio signal source unit 8 generates various signals necessary for indicating to the parties the status of the call connection process by way of sound, e.g., ringing tone, busy tone, waiting sound, audio message or the like.

Each of EKTs 10a-10m and attendant console 30 includes a hand-set, dial keys, other function keys, light emitting diodes (LEDs) and liquid crystal display (LCD). The LCD displays numerical data and alphabet data. During an ACD operation, the LCD displays data relating to alarm message to notify the operator that the predetermined number of incoming calls are received and held. The function keys of EKTs 10a-10m and attendant console 30 include speed dial keys, hold key, etc. In this embodiment, EKTs 10a-10m are also divided into five telephone groups by the operator.

According to a novel aspect of the invention, there is provided a device that stores computer programs and several memory blocks MB1-MB11 as shown in FIGS. 2-12. The memory blocks MB1-MB11 are used in the following manner in the embodiment of the present invention.

The first memory block MB1 shown in FIG. 2 stores a condition of each Directory Number (DN) corresponding to an internal telephone number. A '1' data in a memory location indicates that a corresponding DN is busy and a '0' data indicates that a corresponding DN is idle.

The second memory block MB2 shown in FIG. 3 stores a condition of each Trunk Directory Number (TDN) corresponding to office telephone lines 20a-20l. A '1' data in a memory location indicates that a corresponding TDN is busy and a '0' data indicates that a corresponding TDN is idle.

The third memory block MB3 shown in FIG. 4 stores group number data related to each TDN. The group number data indicates the divided telephone group.

The fourth memory block MB4 shown in FIG. 5 stores designated DN data in each group. The stored DN data shown at the left hand is a first call priority. So, DN data in each group is stored in call priority order.

The fifth memory block MB5 shown in FIG. 6 stores designated EKT data related to each DN.

The sixth memory block MB6 shown in FIG. 7 stores TDN data related to held office telephone lines 20a-20l when incoming calls are received and held. The stored TDN data shown at the left hand is the oldest incoming call.

The seventh memory block MB7 stores data related to the number of the current queue. The current queue corresponds to the held incoming calls shown in the sixth memory block MB6.

The eighth memory block MB8 shown in FIG. 9 stores data indicating an establishment of alarm mode. A '1' data indicates that the alarm mode is set and a '0' data indicates that the alarm mode is not set.

The ninth memory block MB9 shown in FIG. 10 stores data related to a predetermined EKT number in each group. The predetermined EKT is called 'Supervisor.' Every group may indicate a common EKT. Usually, in a small capacity switching system, the predetermined EKT is a common EKT.

The tenth memory block MB10 shown in FIG. 11 stores data related to a registered number of queue in each group.

The eleventh memory block MB11 shown in FIG. 12 stores a condition of each EKT. A '1' data in a memory location indicates that a corresponding EKT is busy and a '0' data indicates that a corresponding E K T is idle.

The data in memory blocks MB3 through MB5 and MB8 through MB10 is stored by the operator of processing unit 40. The registration is shown in FIG. 12. When the operator inputs data indicating which memory block data is to be input by keyboard 42, processing unit 40 transmits the indicating data to control unit 9. Control unit 9 receives and stores the indicating data, steps 101 and 102. Thereafter, when the operator inputs registration data including group number data, alarm set data, queue number data or supervisor EKT data, the control unit 9 responsive to the registration data detects whether the received data is right, steps 103 and 104. If the received data is right, control unit 9 stores the received data in a corresponding memory block, step 106. The memory block is determined by the received indicating data, step 105. If the received data is not right, control unit 9 sends an alarm signal to processing unit 40, step 107. If processing unit 40 receives the alarm signal, it causes CRT display 43 to display a data error message to urge the operator to input data again.

Processing unit 40 also receives data related to the automatic telephone call distribution (A CD) data in the above memory block, from memory device 7 under the control of control unit 9, when request data is transmitted to control unit 9 by the use of keyboard 42. The received ACD data is displayed on CRT display 43. In this embodiment, EKT 10m is located near processing unit 40 and assigned a monitor key as one of its function keys. If the monitor key is depressed, the key data is transmitted to control unit 9. Control unit 9 responsive to the key data transmits the ACD data to processing unit 40. Thus, the ACD data is also displayed on CRT display 43 by the depression of the monitor key in EKT 10m.

Figure 14:
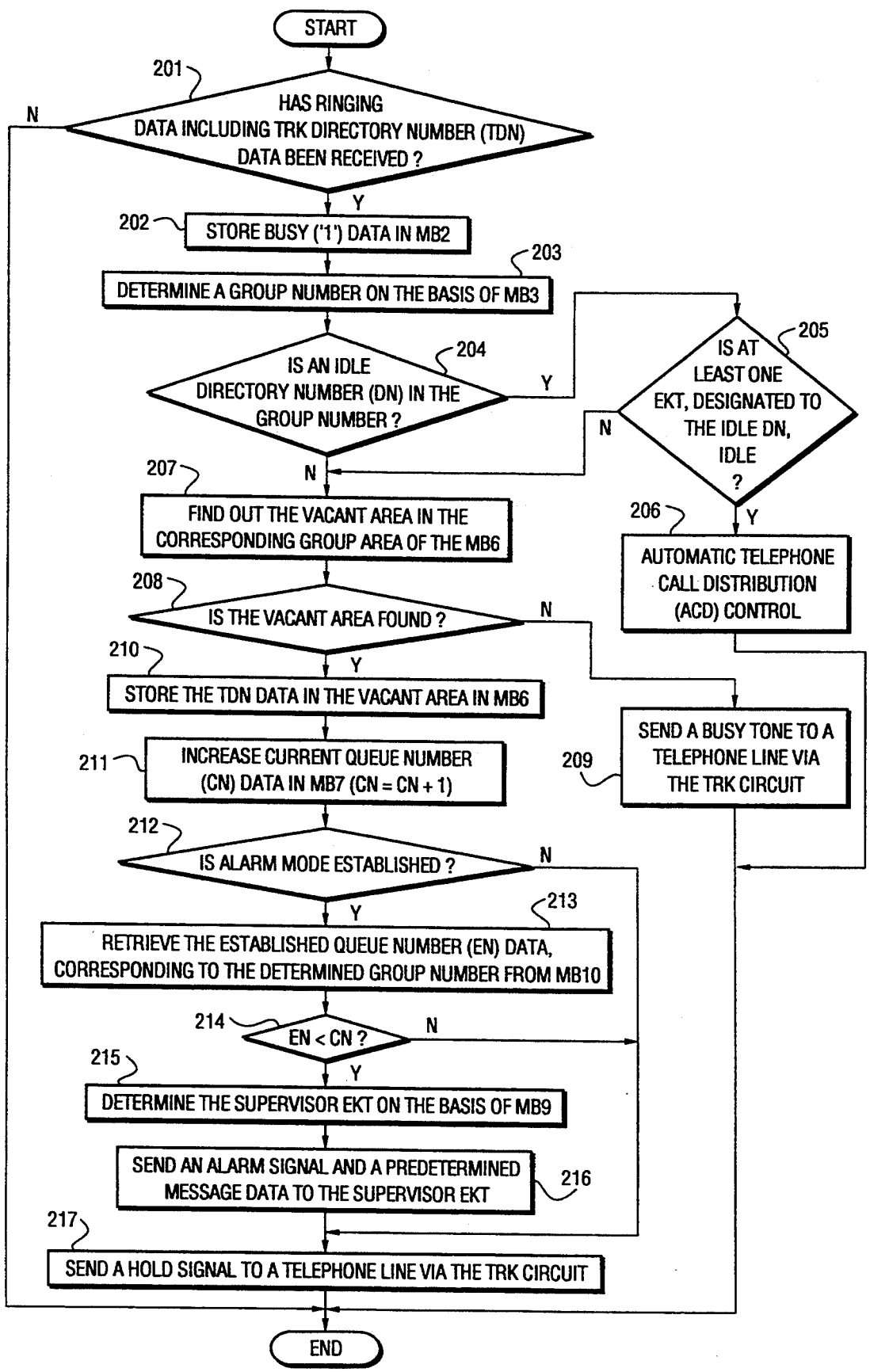
FIG. 14 is a flow chart showing an automatic telephone call distribution operation when a new incoming telephone call is received.
Figure 15:
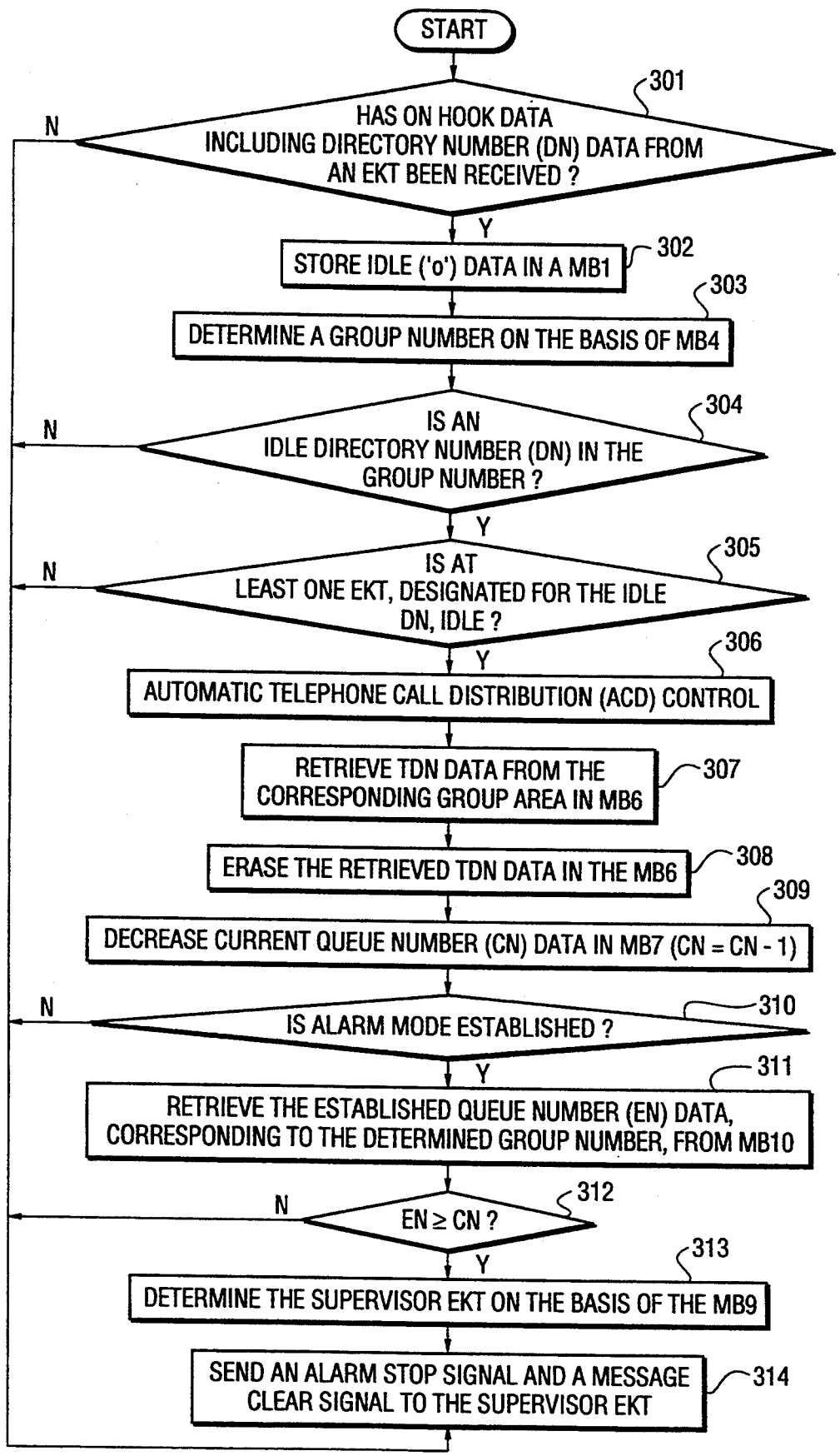
FIG. 15 is a flow chart showing an automatic telephone call distribution operation when a busy telephone set changes to an idle state.

An automatic telephone call distribution (ACD) operation according to the preferred embodiment will now be described with reference to FIGS. 14 and 15. In particular, FIG. 14 pertains to a call control operation when a new incoming call is received and FIG. 15 pertains to a call control operation after an on-hook operation has occurred.

When a ringing signal is delivered through the office line, e.g., office line 20a, the signal is detected by the interface of trunk circuit 3a and the detected ringing data is sent to control unit 9 through bus 13. The detected data includes TDN data. Control unit 9 responsive to the data stores a '1' data (busy) in MB2, (steps 201 and 202). The stored memory location is determined by the received TDN data. Then, control unit 9 determines a group number on the basis of data in MB3, (step 203). After this determination, control unit 9 detects DNs related to the determined group on the basis of data in MB4 and detects whether the detected DNs are idle in call priority order on the basis of data in MB1, (step 204). If control unit 9 detects the idle DN, it then detects whether at least one EKT related to the detected DN is idle on the basis of data in MB11, (step 205).

If control unit 9 detects the idle EKT assigned to the idle DN, it determines the EKTs related to a first priority DN in the idle DNs and sends ringing data to the EKTs assigned to the determined DN. Thus, the automatic telephone call distribution (ACD) control is carried out, (step 206).

If control unit 9 determines that all assigned DNs are busy or all EKTs related to the idle DNs are busy, (steps 204 and 205), it finds out the vacant area (memory location) in the corresponding group area of MB6, (step 207). If a vacant area is not found, control unit 9 sends a busy tone from audio signal source unit 8 to office line 20a through exchange switch 6 and trunk circuit 3a, (steps 208 and 209). If a vacant area is found, control unit 9 stores the TDN data in the detected vacant area of MB6 and increases the current queue number (CN) data in MB7, (steps 210 and 211). The CN is increased by one (CN=CN+1). Then, control unit 9 detects whether the alarm mode with respect to the corresponding group is established on the basis of data in MB8, (step 212). If the alarm mode is not established, control unit 9 sends a hold sound from audio signal source unit 8 to office line 21a through exchange switch 6 and trunk circuit 3a, (step 217). If the alarm mode is established, control unit 9 retrieves the established queue number (EN) data, with respect to the corresponding group, from MB10, (step 213). Control unit 9 compares both the established queue number (EN) and the current queue number (CN) data, (step 214). As a result of this comparison, if the established queue number (EN) data is less than the current queue number (CN) data, control unit 9 determines the predetermined EKT (Supervisor) on the basis of data in MB9, (step 215). Thereafter, control unit 9 sends an alarm signal and a predetermined message data to the predetermined EKT through data bus 13 and the corresponding line circuit, (step 216). For example, the message data may indicate that 'Many incoming calls are held'. The predetermined EKT displays the received message on its LCD. Further, the predetermined EKT responsive to the alarm signal generates an alarm tone from a sounder (not shown) while the message is being displayed. The message and alarm tone are displayed and generated even if the predetermined EKT is busy. Therefore, the operator of the predetermined EKT can know that many incoming calls are presently on hold.

If the operator of the EKT completes his communication after knowing the held state, the EKT sends on-hook data to control unit 9 through the line circuit and data bus 13. The on-hook data includes DN data. Control unit 9 responsive to the on-hook data stores a '0' data (idle) in a memory location, corresponding to received DN data, in MB1, instead of a '1' data (busy), (steps 301 and 302). Then, control unit 9 determines a group number related to the received DN data on the basis of data in MB4, (step 303). Control unit 9 detects whether all DNs related to the determined group are busy (step 304). If all DNs are busy, the alarm tone and message are continued. If at least one EKT assigned to the idle DNs is idle on the basis of data in MB11, control unit 9 determines the EKTs related to a first priority DN in the idle DNs on the basis of data in MB4 and sends ringing data to EKTs assigned to the determined DN, (steps 304–306). Thus, the automatic telephone call distribution (ACD) is carried out.

After controlling the automatic telephone call distribution (ACD), control unit 9 retrieves the TDN data related to the above ACD control, from the corresponding group area in MB6, (step 307). Then, control unit 9 erases the retrieved TDN data and decreases the current number (CN) data in MB7, (steps 308 and 309).

The CN is subtracted by one (CN=CN−1). Then, control unit 9 detects whether the alarm mode, with respect to the corresponding group, is established on the basis of data in MB8, (step 310). If the alarm mode is established, control unit 9 retrieves queue number (EN) data, with respect to the corresponding group, from MB10, (step 311). Control unit 9 compares both the established queue number (EN) data and current queue number (CN) data. As a result of this comparison, if the established queue number (EN) data is equal to the current queue number (CN) data or more than the current queue number (CN) data, control unit 9 determines the predetermined EKT (Supervisor) on the basis of data in MB9, (steps 312 and 313). Thereafter, control unit 9 sends an alarm stop signal and a message clear signal to the predetermined EKT through data bus 13 and the corresponding line circuit, (step 314). The EKT, responsive to the signals discontinues generating the alarm tone and visual message. So, the operator can know that the held incoming call is eliminated.

In general, the predetermined EKT (Supervisor) is located near processing unit 40, keyboard 42, CRT display 43 and printer 44, as EKT 10m in this embodiment. The operator of the predetermined EKT can usually know and change the data established in the MBs. If the operator changes data relating to MB5 after knowing the alarm tone and message and understanding the data in the MBs by depression of the monitor key in EKT 10m, the held incoming call is received by the EKT related to the changed EKT data. For example, EKT 10c does not respond to the held incoming call even if a DN101 is only idle when EKT 10c is only idle and does not have the DN101, because EKT 10c is not assigned to the DN101. In this ease, since the operator of the predetermined EKT 10m can add further EKT 10c data related to the DN101, in MB5, the idle EKT 10c is able to be used to respond to the held incoming call.

In the preferred embodiment, one EKT is assigned to a predetermined EKT (Supervisor) with respect to each group. However, a few predetermined EKTs may be assigned. Also, each group may be assigned to the same EKT located near processing unit 40, as a predetermined EKT (Supervisor).

Furthermore, in this embodiment, control unit 9 sends a predetermined message data to the predetermined EKT (Supervisor). However, control unit 9 may send changeable message data including current queue number data to the predetermined EKT (Supervisor) to notify the operator of the number of waiting incoming calls.

While the invention has been described herein by reference to several preferred embodiments, various modifications can be made without departing from the true scope and spirit of the invention. It is my intention, therefore, by the appended claims, to embody all such modifications.

I claim:

1. A switching system coupled to a plurality of telephone lines and a plurality of telephone sets, said switching system comprising:
    a plurality of trunk circuits, each coupled to one of said telephone lines, for detecting an incoming call from said telephone lines and for outputting a detected trunk directory number corresponding to said detected incoming call;
    a memory for storing a first table relating each of a plurality of trunk directory numbers to one of a plurality of group numbers, a second table relating each said group number to one or more directory numbers in a priority order, a third table relating each said directory number to one or more of said telephone sets, in-use status information for each of said telephone sets and each of said directory numbers, a detected number of incoming calls on hold for each said group, and a predetermined number of incoming calls on hold for each said group;
    means, coupled to said trunk circuits and said memory, for determining called telephone sets using said detected trunk directory number and said first, second and third tables;
    in-use status determining means for determining the in-use status of said called telephone sets as either busy or idle from said in-use status information;
    means for performing an automatic call distribution when one or more of said called telephone sets is idle;
    means for holding said detected incoming call when said called telephone sets are all busy;
    means, responsive to said in-use status determining means, for incrementing the detected number of incoming calls on hold for the group corresponding to said detected trunk directory number when said called telephone sets are all busy;
    comparing means for comparing said detected number of incoming calls on hold and said predetermined number of incoming calls on hold for said group corresponding to said detected trunk directory number; and
    transmitting means, responsive to said comparing means, for transmitting alarm information to a predetermined telephone set when said detected number of incoming calls on hold exceeds said predetermined number of calls on hold thereby providing notification of a holding state of said held incoming telephone calls.

2. The system according to claim 1, wherein:
    said memory further stores a fourth table relating each group number to detected trunk directory numbers having incoming calls on hold, said fourth table having a predetermined number of locations available for storing said detected trunk directory numbers; and
    said means for holding comprises means for writing said detected trunk directory number in said fourth table if a location is available.

3. The system according to claim 2, said system further comprising:
    location detecting means for detecting whether a location in said fourth table is available; and
    means for outputting a busy tone over said telephone line if said location detecting means detects that no location in said fourth table is available.

4. The system according to claims 2, further comprising:
    means for detecting on-hook of one of said telephone sets and a directory number of said one telephone set;
    means, coupled to said memory, for automatically distributing an incoming call on hold to said one telephone set;
    means for erasing from said fourth table the detected trunk directory number corresponding to said distributed incoming call; and means for decrementing the detected number of incoming calls on hold corresponding to the group of said erased detected trunk directory number.

5. A switching system coupled to a plurality of telephone lines and a plurality of telephone sets, said switching system comprising:
- a plurality of trunk circuits, each coupled to one of said telephone lines, for detecting an incoming call from said telephone lines and for outputting a detected trunk directory number corresponding to said detected incoming call;
- a memory for storing a first table relating each of a plurality of trunk directory numbers to one of a plurality of group numbers, a second table relating each said group number to one or more directory numbers in a priority order, a third table relating each said directory number to one or more of said telephone sets, in-use status information for each of said telephone sets and each of said directory numbers, a detected number of incoming calls on hold for each said group, and a predetermined number of incoming calls on hold for each said group;
- means, coupled said trunk circuits and to said memory, for determining called telephone sets using said detected trunk directory number and said first, second and third tables;
- means for holding said detected incoming call when said called telephone sets are all busy;
- means for incrementing the detected number of incoming calls on hold for the group corresponding to said detected trunk directory number when said called telephone sets are all busy;
- comparing means for comparing said detected number of incoming calls on hold and said predetermined number of incoming calls on hold for said group corresponding to said detected trunk directory number; and
- transmitting means, responsive to said comparing means, for transmitting alarm information to a predetermined telephone set when said detected number of incoming calls on hold exceeds said predetermined number of calls on hold thereby providing notification of a holding state of said held incoming telephone calls.

6. A method of operating a switching system coupled to a plurality of telephone lines, said method comprising the steps of:
- detecting an incoming call from said telephone lines and for outputting a detected trunk directory number corresponding to said detected incoming call;
- storing a first table relating each of a plurality of trunk directory numbers to one of a plurality of group numbers, a second table relating each said group number to one or more directory numbers in a priority order, a third table relating each said directory number to one or more of said telephone sets, in-use status information for each of said telephone sets and each of said directory numbers, a detected number of incoming calls on hold for each said group, and a predetermined number of incoming calls on hold for each said group;
- determining called telephone sets using said detected trunk directory number and said first, second and third tables;
- holding said detected incoming call when said called telephone sets are all busy;
- incrementing the detected number of incoming calls on hold for the group corresponding to said detected trunk directory number when said called telephone sets are all busy;
- comparing said detected number of incoming calls on hold and said predetermined number of incoming calls on hold for said group corresponding to said detected trunk directory number; and
- transmitting alarm information to a predetermined telephone set when said detected number of incoming calls on hold exceeds said predetermined number of calls on hold thereby providing notification of a holding state of said held incoming telephone calls.

7. The method according to claim 6, further comprising the steps of:
- determining the in-use status of said called telephone sets as either busy or idle from said in-use status information; and
- performing an automatic call distribution when one or more of said called telephone sets is idle.

8. The method according to claim 7, further comprising the steps of:
- storing a fourth table relating each group number to detected trunk directory numbers having incoming calls on hold, said fourth table having a predetermined number of locations available for storing said detected trunk directory numbers; and
- writing said detected trunk directory number in said fourth table if a location is available.

9. The method according to claim 8, further comprising the steps of:
- detecting whether a location in said fourth table is available; and
- outputting a busy tone over said telephone line if it is detected that no location in said fourth table is available.

10. The method according to claim 8, further comprising the steps of:
- detecting on-hook of one of said telephone sets and a directory number of said one telephone set;
- distributing an incoming call on hold to said one telephone set;
- erasing from said fourth table the detected trunk directory number corresponding to said distributed incoming call; and
- decrementing the detected number of incoming calls on hold corresponding to the group of said erased detected trunk directory number.

* * * * *